(12) United States Patent
Fujinaga et al.

(10) Patent No.: US 9,023,240 B2
(45) Date of Patent: *May 5, 2015

(54) SILICON NITRIDE POWDER FOR SILICONNITRIDE PHOSPHOR, CAALSIN₃ PHOSPHOR USING SAME, SR₂SI₅N₈ PHOSPHOR USING SAME, (SR, CA)ALSIN₃ PHOSPHOR USING SAME, LA₃SI₆N₁₁ PHOSPHOR USING SAME, AND METHODS FOR PRODUCING THE PHOSPHORS

(75) Inventors: Masataka Fujinaga, Yamaguchi (JP); Takayuki Ueda, Yamaguchi (JP); Takuma Sakai, Yamaguchi (JP); Shinsuke Jida, Yamaguchi (JP)

(73) Assignee: UBE Industries, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/813,596

(22) PCT Filed: Jul. 29, 2011

(86) PCT No.: PCT/JP2011/067467
§ 371 (c)(1),
(2), (4) Date: Feb. 25, 2013

(87) PCT Pub. No.: WO2012/017949
PCT Pub. Date: Feb. 9, 2012

(65) Prior Publication Data
US 2013/0140490 A1   Jun. 6, 2013

(30) Foreign Application Priority Data

Aug. 4, 2010  (JP) .................. 2010-175724
Aug. 30, 2010 (JP) .................. 2010-192192
Aug. 30, 2010 (JP) .................. 2010-192209
Aug. 30, 2010 (JP) .................. 2010-192252

(51) Int. Cl.
   *C09K 11/08*   (2006.01)
   *C09K 11/77*   (2006.01)
   *C01B 21/068*  (2006.01)
   *C01B 21/06*   (2006.01)

(52) U.S. Cl.
   CPC ......... *C01B 21/068* (2013.01); *Y10T 428/2982* (2015.01); *C01B 21/0602* (2013.01); *C01P 2002/54* (2013.01); *C01P 2004/03* (2013.01); *C01P 2004/61* (2013.01); *C01P 2006/12* (2013.01); *C01P 2006/80* (2013.01); *C09K 11/0883* (2013.01); *C09K 11/7734* (2013.01); *C09K 11/7774* (2013.01); *C09K 11/7792* (2013.01); *C01P 2004/62* (2013.01)

(58) Field of Classification Search
   CPC ............ C09K 11/083; C09K 11/0883; C09K 11/643; C09K 11/7703; C09K 11/7706; C09K 11/7715; C09K 11/7718; C09K 11/7721; C09K 11/7728; C09K 11/7734; C09K 11/7746; C09K 11/7749; C09K 11/7761; C09K 11/7774; C09K 11/7792; C01P 2004/03; C01P 2004/61; C01P 2004/06; C01P 2006/80; C01P 2002/54; C01P 2004/52; C01P 2006/12; C04B 35/584; C04B 2235/3878; C04B 2235/5409; C04B 2235/5436; C04B 2235/723; H01L 23/15; H01L 23/3731; H01L 33/504; C01B 21/0602; C01B 21/068; Y02B 20/181
   USPC ....... 252/301.4 F, 301.4 R, 301.6 F; 428/325, 428/402, 698, 704
   See application file for complete search history.

(56) References Cited

U.S. PATENT DOCUMENTS

| | | | |
|---|---|---|---|
| 6,682,663 B2 | 1/2004 | Botty et al. | |
| 8,147,715 B2* | 4/2012 | Hirosaki | ................ 252/301.4 F |
| 2002/0164475 A1* | 11/2002 | Imamura et al. | ............. 428/325 |
| 2005/0094381 A1* | 5/2005 | Imamura et al. | ............. 361/750 |
| 2006/0033083 A1* | 2/2006 | Sakane et al. | ........... 252/301.4 F |
| 2009/0134775 A1* | 5/2009 | Watanabe et al. | ............ 313/503 |
| 2009/0250663 A1* | 10/2009 | Oshio | .................... 252/301.4 R |
| 2010/0085728 A1* | 4/2010 | Seto et al. | ...................... 362/84 |
| 2011/0121234 A1* | 5/2011 | Hirosaki | ................ 252/301.4 F |
| 2011/0272187 A1* | 11/2011 | Kaga et al. | .................... 174/260 |
| 2012/0305958 A1* | 12/2012 | Seibel et al. | ................... 257/98 |

FOREIGN PATENT DOCUMENTS

| | | |
|---|---|---|
| CN | 1839192 A | 9/2006 |
| CN | 101090953 A | 12/2007 |

(Continued)

OTHER PUBLICATIONS

Hoppe, H.A., et al, "Luminescence in EU2+-doped Ba2Si5N8: fluorescence, thermoluminescence, and upconversion", Journal of Physics and Chemistry of Solids, 2000, vol. 61, pp. 2001-2006.
Van Krevel, J.W.H., "On new rare-earth doped M—Si—Al—O—N materials Luminescence properties and oxidation resistance", TU Eindhoven, 2000, ISBN 90-386-2711-4, pp. 29-40.
Hirosaki, Naoto et al., "Synthesis and Crystal Structure of Red Nitride Phosphor, CaAlSiN3:Eu2+", The 65th Meeting of The Japan Society of Applied Physics, Lecture notes, 2004, p. 1283.
English translation of the International Preliminary Report on Patentability which issued in connection with corresponding International Application No. PCT/JP2011/067467.

*Primary Examiner* — Carol M Koslow
*Assistant Examiner* — Lynne Edmondson
(74) *Attorney, Agent, or Firm* — Clark Hill PLC

(57) ABSTRACT

Provided are a crystalline silicon nitride powder for a siliconitride phosphors, which is used as a starting material for producing a siliconitride phosphor containing a silicon element and a nitrogen element but no oxygen element as a constitutent element, an oxygen content of the silicon nitride phosphor being 0.2-0.8 wt %; a CaAlSiN₃ phosphor, an Sr₂Si₅N₈ phosphor, an (Sr, Ca)AlSiN₃ phosphor and an La₃Si₆N₁₁ phosphor, each using the silicon nitride powder; and a method for producing the phosphors.

6 Claims, 1 Drawing Sheet

(56) References Cited

FOREIGN PATENT DOCUMENTS

| | | |
|---|---|---|
| CN | 101171321 A | 4/2008 |
| CN | 101434839 A | 5/2009 |
| JP | 09-040406 | 2/1997 |
| JP | 2000-208815 | 7/2000 |
| JP | 2002-097005 | 4/2002 |
| JP | 2003-112977 | 4/2003 |
| JP | 3837588 | 1/2006 |
| JP | 2007-291352 | 11/2007 |
| JP | 2008-088362 | 4/2008 |
| JP | 2009-218422 | 9/2009 |
| JP | 2010-070773 | 4/2010 |
| WO | 2006/080535 | 8/2006 |
| WO | WO 2007066733 A1 * | 6/2007 |

* cited by examiner

US 9,023,240 B2

SILICON NITRIDE POWDER FOR SILICONNITRIDE PHOSPHOR, CAALSIN₃ PHOSPHOR USING SAME, SR₂SI₅N₈ PHOSPHOR USING SAME, (SR, CA)ALSIN₃ PHOSPHOR USING SAME, LA₃SI₆N₁₁ PHOSPHOR USING SAME, AND METHODS FOR PRODUCING THE PHOSPHORS

RELATED/PRIORITY APPLICATION

This application is a National Phase filing regarding international Application No. PCR/JP2011/067467, filed on Jul. 29, 2011, which relies upon Japanese Application No. JP2010-175724, filed on Aug. 4, 2010, Japanese Patent Application No. 2010-192252, filed on Aug. 30, 2010, Japanese Patent Application No. 2010-192209, filed on Aug. 30, 2010, and Japanese Patent Application No. 2010492192, filed on Aug. 30, 2010, for priority.

TECHNICAL FIELD

The present invention relates to a silicon nitride powder for a siliconitride phosphor having higher fluorescent intensity which is used for a display, a back light of liquid crystal, a fluorescent lamp, a white-light emitting diode, or the like, a CaAlSiN$_3$ phosphor, a Sr$_2$Si$_5$N$_8$ phosphor, a (Sr, Ca)AlSiN$_3$ phosphor, and a La$_3$Si$_6$N$_{11}$ phosphor, each using the silicon nitride powder, and methods for producing the phosphors.

BACKGROUND ART

Recently, in response to realized application of a blue-light emitting diode, a white-light emitting diode having this diode as a light source is actively studied. Since the white-light emitting diode is lightweight, does not use mercury, and has long lifetime, a rapidly rising demand is expected for it in future. In general, as a white-light emitting diode, those obtained by coating paste of a mixture containing YAG (Y$_3$Al$_5$O$_{12}$:Ce) powder activated by cerium and epoxy resin on a blue-light emitting device are used (Patent Literature 1).

However, as the fluorescent color of YAG:Ce is present near x=0.41, y=0.56 of CIE color coordinates, when admixed with excitation light with blue color of 460 nm, the color is controlled on a line which connects the color coordinates of the blue-light emitting diode and the color coordinates of YAG, and as a result, white color mixed with greenish blue color is obtained instead of white color. For such reasons, a problem arises in that only white color with insufficient red color can be achieved. To deal with such poor color problem, YAG:Ce phosphor powder is admixed with a separate phosphor powder exhibiting red color for color control.

However, there are only very few reports regarding a phosphor which absorbs blue-color light and emits red-color fluorescence. As a specific example, Ba$_2$Si$_5$N$_8$ activated by europium (Eu) has been reported in Non-Patent Literature 1. Further, CaAlSiN$_3$ activated by Eu, which exhibits higher light output than Ba$_2$Si$_5$N$_8$, is recently found (Non-Patent Literature 2). Further, Patent Literature 2 discloses an example in which a powder of crystalline silicon nitride having average particle diameter of 0.5 μm and oxygen content 0.93% by weight is used as a raw material and compositional ratio and sites for CaAlSiN$_3$ are modified to control florescence characteristics.

Further, as a phosphor having A$_2$Si$_5$N$_8$ crystal structure that is activated rare earth element, a red-light emitting material as disclosed in Non-Patent Literature 3, i.e., a phosphor having M$_x$Si$_y$N$_z$ (M=Ca, Sr, Ba, or Zn; x, y, and z may have various values) as a mother skeleton, or Patent Literature 3, i.e., a phosphor having M$_x$Si$_y$N$_z$:Eu (M=Ca, Sr, Ba, Zn; z=2/3x+4/3y) as a mother skeleton is known. However, with excitation by blue-color visible light, the red light emission intensity remains insufficient.

Recently, a white-light emitting diode having near ultraviolet to blue-light emitting diode as an excitation source is actively studied. Thus, a phosphor emitting strong yellow light in response to such excitation wavelength is waited for. As a yellow-color luminescent material, Y$_3$Al$_5$O$_{12}$:Ce has been conventionally used. However, as disclosed in Patent Literature 4, La$_3$Si$_6$N$_{11}$ is also known.

Accordingly, those nitride phosphors can be used for a vacuum fluorescent display (VFD), a field emission display (FED), a plasma display panel (PDP), a cathode ray tube (CRT), a white-light emitting diode (LED), or the like, and their use as a phosphor having low luminance degradation is expected.

CITATION LIST

Patent Literatures

Patent Literature 1: JP 2000-208815 A
Patent Literature 2: JP 3837588 B1
Patent Literature 3: U.S. Pat. No. 6,682,663
Patent Literature 4: JP 2010-70773 A

Non-Patent Literatures

Non-Patent Literature 1: Journal of Physics and Chemistry of Solids, Vol. 61 (2000) pages 2001 to 2006
Non-Patent Literature 2: The 65th Meeting of The Japan Society of Applied Physics, Lecture notes, page 1283.
Non-Patent Literature 3: "On new rare-earth doped M-Si—Al—O—N materials", written by J. W. H. van Krevel, T U Eindhoven 2000, ISBN 90-386-2711-4

SUMMARY OF INVENTION

Technical Problem

Since the fluorescent intensity of those nitride phosphors is not sufficient yet, development of a phosphor having higher luminance is in need. In this regard, an object of the present invention is to provide a silicon nitride powder for siliconitride phosphor having high luminance, which can be used for a vacuum fluorescent display (VFD), a field emission display (FED), a plasma display panel (PDP), a cathode ray tube (CRT), a light emitting diode (LED), or the like, a CaAlSiN$_3$ phosphor, a Sr$_2$Si$_5$N$_8$ phosphor, a (Sr, Ca)AlSiN$_3$ phosphor, and a La$_3$Si$_6$N$_{11}$ phosphor, each using the silicon nitride powder, and methods for producing the phosphors.

Solution to Problem

The inventors of the present invention conducted intensive studies to solve the aforementioned problems, and as a result, found that a CaAlSiN$_3$ phosphor, a Sr$_2$Si$_5$N$_8$ phosphor, a (Sr, Ca)AlSiN$_3$ phosphor, and a La$_3$Si$_6$N$_{11}$ phosphor having high fluorescent intensity can be obtained by using powder containing specific crystalline silicon nitride particles as a raw material, and completed the invention accordingly.

Namely, the present invention relates to a crystalline silicon nitride powder for siliconitride phosphors, which is used as a raw material for producing a siliconitride phosphor comprising a silicon element and a nitrogen element but no oxygen element as a constituent element, an oxygen content of said silicon nitride powder being 0.2% by weight to 0.9% by weight.

Further, the present invention relates to a method for producing a $CaAlSiN_3$ phosphor by using the silicon nitride powder for the siliconitride phosphors, the method comprising: mixing the silicon nitride powder for the siliconitride phosphors, a material as an aluminum source, a material as a calcium source, and a material as an europium source to have the general formula of $(Eu_xCa_{1-x})AlSiN_3$; and calcining the mixture at 1400 to 2000° C. under a nitrogen atmosphere of 0.05 MPa to 100 MPa.

Further, the present invention relates to a $CaAlSiN_3$ phosphor using the silicon nitride powder for the siliconitride phosphors, which is represented by the general formula of $(Eu_xCa_{1-x})AlSiN_3$, and is obtained by calcining a mixture powder including the silicon nitride powder for the siliconitride phosphors, a $Ca_3N_2$ powder, an AlN powder, and an EuN powder at 1400 to 2000° C. under a nitrogen-containing inert gas atmosphere.

Further, the present invention relates to a method for producing a $Sr_2Si_5N_8$ phosphor by using the silicon nitride powder for the siliconitride phosphors, the method comprising: mixing the silicon nitride powder for the siliconitride phosphors, a material as a strontium source, and a material as an europium source to have the general formula of $(Eu_xSr_{1-x})_2Si_5N_8$; and calcining the mixture at 1400 to 2000° C. under a nitrogen atmosphere of 0.05 MPa to 100 MPa.

Further, the present invention relates to a $Sr_2Si_5N_9$ phosphor using the silicon nitride powder for the siliconitride phosphors, which is represented by the general formula of $(Eu_xSr_{1-x})_2Si_5N_8$, and is obtained by calcining a mixture powder including the silicon nitride powder for the siliconitride phosphors, a strontium nitride powder and an europium nitride powder at 1400 to 2000° C. under a nitrogen-containing inert gas atmosphere.

Further, the present invention relates to a method for producing a $(Sr, Ca)AlSiN_3$ phosphor by using the silicon nitride powder for the siliconitride phosphors, the method comprising: mixing the silicon nitride powder for the siliconitride phosphors, a material as a strontium source, a material as a calcium source, a material as an europium source, and a material as an aluminum source to have the general formula of $(Eu_xSr_yCa_z)AlSiN_3$ (with the proviso that, x+y+z=1); and calcining the mixture at 1400 to 2000° C. under a nitrogen atmosphere of 0.05 MPa to 100 MPa.

Further, the present invention relates to a $(Sr, Ca)AlSiN_3$ phosphor using the silicon nitride powder for the siliconitride phosphors, which is represented by the general formula of $(Eu_xSr_yCa_z)AlSiN_3$ (with the proviso that, x+y+z=1), and is obtained by calcining a mixture powder including the silicon nitride powder for the siliconitride phosphors, a $Sr_3N_2$ powder, a $Ca_3N_2$ powder, an EuN powder, and an AlN powder at 1400 to 2000° C. under a nitrogen-containing inert gas atmosphere.

Further, the present invention relates to a method for producing a $La_3Si_6N_{11}$ phosphor by using the silicon nitride powder for the siliconitride phosphors, the method comprising: mixing the silicon nitride powder for the siliconitride phosphors, a material as a lanthanum source, and a material as a cerium source to have the general formula of $(Ce_xLa_{1-x})_3Si_6N_{11}$; and calcining the mixture at 1400 to 2000° C. under a nitrogen atmosphere of 0.05 MPa to 100 MPa.

Further, the present invention relates to a $La_3Si_6N_{11}$ phosphor using the silicon nitride powder for the siliconitride phosphors, which is represented by the general formula of $(Ce_xLa_{1-x})_3Si_6N_{11}$, and is obtained by calcining a mixture powder including the silicon nitride powder for the siliconitride phosphors, a LaN powder and a CeN powder at 1400 to 2000° C. under a nitrogen-containing inert gas atmosphere.

Advantageous Effects of Invention

As described above, according to the invention, silicon nitride powder for siliconitride phosphor having high luminance, which can be used for a vacuum fluorescent display (VFD), a field emission display (FED), a plasma display panel (PDP), a cathode ray tube (CRT), a light emitting diode (LED), or the like, a $CaAlSiN_3$ phosphor, a $Sr_2Si_5N_8$ phosphor, a $(Sr, Ca)AlSiN_3$ phosphor, and a $La_3Si_6N_{11}$ phosphor, each using the silicon nitride powder, and methods for producing them are provided.

DESCRIPTION OF EMBODIMENTS

Figure 1:
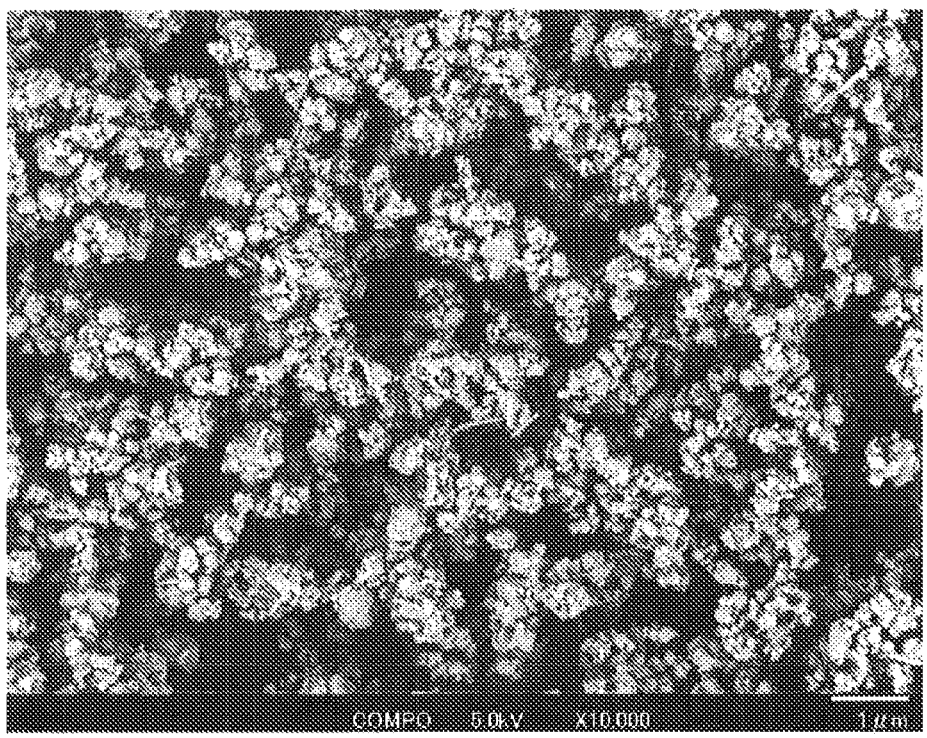
FIG. 1 is a scanning electron microscope image illustrating the particles of a powder of crystalline silicon nitride according to Example 1.

The silicon nitride powder for siliconitride phosphor according to the invention is a raw material for producing a siliconitride phosphor containing a silicon element and a nitrogen element but having no oxygen element as a constituent element, and specifically it is a powder of crystalline silicon nitride for use as a raw material for producing a $CaAlSiN_3$ phosphor, a $Sr_2Si_5N_8$ phosphor, a $(Sr, Ca)AlSiN_3$ phosphor, or a $La_3Si_6N_{11}$ phosphor. In the present invention, the crystalline silicon nitride is preferably a type silicon nitride.

Oxygen content in the silicon nitride powder for siliconitride phosphor according to the invention is 0.2% by weight to 0.9% by weight. Meanwhile, oxygen content in silicon nitride powder as a raw material for conventional phosphors is 1.0 by weight to 2.0% by weight. In this regard, by using silicon nitride powder with low oxygen content as described in the present invention as a raw material for a phosphor, a siliconitride phosphor having higher fluorescent intensity than conventional phosphors can be obtained. The oxygen content in silicon nitride powder is preferably 0.2% by weight to 0.8% by weight, and more preferably 0.2% by weight to 0.4% by weight. Having oxygen content equal to or lower than 0.2% by weight is difficult to achieve in terms of production. On the other hand, even when the oxygen content is equal to or higher than 0.9% by weight, no significant improvement in fluorescence properties is observed, and therefore undesirable. Measurement of oxygen content was performed by using the oxygen and nitrogen analyzer manufactured by LECO Corporation.

Average particle diameter of the silicon nitride powder according to the invention is preferably 1.0 µm to 12 µm. When it is used as a raw material for producing a $CaAlSiN_3$ phosphor or a $Sr_2Si_5N_8$ phosphor, the average particle diameter is more preferably 2.0 µm to 12 µm. Further, when it is used as a raw material for producing a $(Sr, Ca)AlSiN_3$ phosphor or a $La_3Si_6N_{11}$ phosphor, the average particle diameter is more preferably 1.0 µm to 8 µm. When the average particle diameter is less than 1.0 µm, oxygen content tends to increase, yielding lower effect resulting from fluorescent properties. On the other hand, when the average particle diameter is more than 12 μm, production is difficult to achieve, and therefore practically not useful. Meanwhile, the average particle diameter was measured from a scanning electron microscope image according to the following procedures. Specifically, a circle is drawn on a scanning electron microscope image, a maximum-size circle inscribed to a particle in contact with the circle is determined for each particle, and average of the particle diameter which is determined as the diameter of the circle is obtained for the particles to calculate the average particle diameter of particles. Number of the particles as a subject for measurement was about 50 to 150.

Specific surface area of the silicon nitride powder according to the invention is preferably 0.2 $m^2/g$ to 4.0 $m^2/g$. When it is used as a raw material for producing a $CaAlSiN_3$ phosphor or a $Sr_2Si_5N_8$ phosphor, the specific surface area of the silicon nitride powder is more preferably 0.2 $m^2/g$ to 3.0 $m^2/g$. Further, when it is used as a raw material for producing a (Sr, Ca)$AlSiN_3$ phosphor or a $La_3Si_6N_{11}$ phosphor, the specific surface area of the silicon nitride powder is more preferably 0.3 $m^2/g$ to 3.0 $m^2/g$. The silicon nitride powder having the specific surface area of less than 0.2 $m^2/g$ is difficult to achieve in terms of production, and therefore it is practically not useful and inconvenient for obtaining a device containing it. On the other hand, when the specific surface area is more than 4.0 $m^2/g$, the effect resulting from fluorescent properties is lowered, and therefore it is preferably 0.2 $m^2/g$ to 4.0 $m^2/g$. The specific surface area was measured by using an apparatus for measuring specific surface area, i.e., FLOW SORB 2300 manufactured by Shimadzu Corporation (BET method based on nitrogen gas adsorption).

The silicon nitride powder for siliconitride phosphor according to the invention can be obtained by thermal degradation of a nitrogen-containing silane compound and/or non-crystalline (i.e., amorphous) silicon nitride powder. Examples of the nitrogen-containing compound include silicon diimide ($Si(NH)_2$), silicon tetraamide, silicon nitrogen imide, and silicon chloroimide or the like. They are produced by a known method like a method of reacting in gas phase a silicon halide such as silicon tetrachloride, silicon tetrabromide, or silicon tetraiodide with ammonia, a method of reacting silicon halide in liquid phase with liquid ammonia, or the like.

Further, as for the amorphous silicon nitride powder, a powder produced by a known method like heating and decomposing the aforementioned nitrogen-containing silane compound in the temperature range of 1200 to 1460° C. under atmosphere of nitrogen or ammonia gas, a method of reacting a silicon halide such as silicon tetrachloride, silicon tetrabromide, or silicon tetraiodide with ammonia at high temperature, or the like is used. Average particle diameter of the amorphous silicon nitride powder and nitrogen-containing silane compound is generally from 0.003 μm to 0.05 μm.

The nitrogen-containing silane compound and the amorphous silicon nitride powder are easily hydrolyzed and oxidized. Thus, weighing of those raw powder materials is performed under inert gas atmosphere. With respect to the materials, according to a known method for improving materials of a reaction vessel and friction state between powder and a metal in an apparatus for handling the powder, the metal impurities present in amorphous silicon nitride powder can be lowered to 10 ppm or less. Further, the oxygen concentration in nitrogen gas purged into a heating furnace used for obtaining amorphous silicon nitride powder can be controlled in the range of from 0.0% by volume to 2.0% by volume. By setting the oxygen concentration in atmosphere during thermal degradation to 100 ppm or less, for example, or preferably 10 ppm or less, amorphous silicon nitride powder having low oxygen content can be obtained. Lower the oxygen concentration in amorphous silicon nitride powder is, lower oxygen content in resulting crystalline silicon nitride particles can be obtained.

Figure 2:
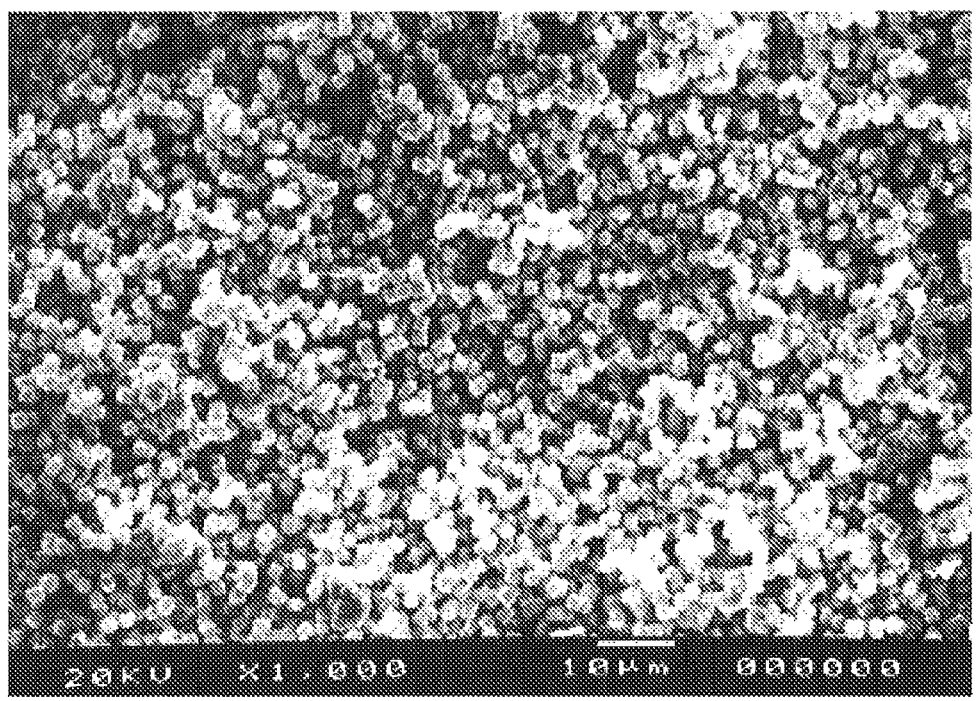
FIG. 2 is a scanning electron microscope image illustrating the particles of a powder of crystalline silicon nitride according to Example 4.

Next, by calcining the nitrogen-containing silane compound and/or amorphous silicon nitride powder in the temperature range of 1300 to 1700° C. under nitrogen or ammonia gas atmosphere, crystalline silicon nitride powder is obtained. By controlling the condition for calcination (i.e., temperature and temperature increase rate), the particle diameter is controlled. According to the invention, to obtain crystalline silicon nitride powder with a low oxygen content, it is necessary to control the oxygen which is simultaneously contained in a nitrogen gas atmosphere used for calcining the nitrogen-containing silane compound to produce amorphous silicon nitride. In order to obtain the crystalline silicon nitride powder with a large particle diameter, it is necessary to have slow temperature increase like 40° C./hour or less when amorphous silicon nitride powder is calcined into a crystalline silicon nitride powder. The crystalline silicon nitride obtained after the process has large primary particles that are approximately in monodispersion state and has no aggregated particles or fused particles, as illustrated in FIG. 2. The obtained crystalline silicon nitride powder is a highly pure powder having metal impurities of 100 ppm or less. Further, when the powder of crystalline silicon nitride is subjected to a chemical treatment like acid washing, crystalline silicon nitride powder with a low oxygen content can be obtained. As a result, the silicon nitride powder for siliconitride phosphor according to the invention, in which the oxygen content is 0.2% by weight to 0.9% by weight, can be obtained.

Further, unlike the silicon nitride powder produced by direct nitridation of metal silicon, the silicon nitride powder as obtained above does not need strong pulverization. Therefore, the impurity amount is very small, i.e., it is 100 ppm or less. The impurities (Al, Ca, and Fe) contained in the silicon nitride powder according to the invention are 100 ppm or less, and preferably 20 ppm or less. Accordingly, a phosphor having high fluorescent intensity can be obtained.

Next, the method for producing a siliconitride phosphor by using the silicon nitride powder for siliconitride phosphor according to the invention will be described.

First, explanations are given for the case in which the siliconitride phosphor is a $CaAlSiN_3$ phosphor. The $CaAlSiN_3$ phosphor according to the invention indicates a phosphor having $CaAlSiN_3$ as a basic structure in which a part of Ca is replaced with an activating element like Eu. The method for producing a $CaAlSiN_3$ phosphor according to the invention includes mixing a powder of the silicon nitride having oxygen content of 0.2% by weight to 0.9% by weight, a material like AlN as an aluminum source, a material like $Ca_3N_2$ as a calcium source, and a material like EuN as an europium source to have the general formula of $(Eu_xCa_{1-x})AlSiN_3$ and calcining the mixture at 1400 to 2000° C. under nitrogen atmosphere of 0.05 MPa to 100 MPa.

Examples of the material as an aluminum source include an aluminum metal as well as aluminum nitride (AlN). Examples of the material as a calcium source include a calcium metal as well as $Ca_3N_2$. Examples of the material as an europium source include a metal europium as well as EuN.

The $CaAlSiN_3$ phosphor according to the invention may emit light even when Mn, Ce, Pr, Nd, Sm, or Yb is used as a light source instead of Eu. However, it is preferable to contain Eu and it is desirably Eu.

The obtained $CaAlSiN_3$ phosphor is a phosphor represented by the general formula of $(Eu_xCa_{1-x})AlSiN_3$ and a part of Ca in CaAlSiN$_3$ is replaced with Eu. The replacement amount x is, although not specifically limited, within the range of 0<x<0.1 in general.

As for the raw material, generally silicon nitride (Si$_3$N$_4$), calcium nitride (Ca$_3$N$_2$), europium nitride (EuN), and aluminum nitride (AlN) are preferably used. As for the method for producing the raw material, any method can be employed if it allows obtainment of the nitride products described above as a final product. Hereinafter, a method for producing representative raw materials will be described.

Ca$_3$N$_2$ can be produced by direct nitridation of metal calcium. Specifically, it can be produced by adding metal calcium into a crucible made of carbon or boron nitride and heating at 600 to 900° C. for nitridation. Further, calcium nitride is also commercially available, and the commercially available product may be used (for example, those manufactured by Aldrich Company).

EuN can be also produced by direct nitridation of metal europium. It can be produced by adding fine powder of metal europium, which is obtained in a nitrogen box by using a file, into a crucible made of carbon or boron nitride, placing it in a kiln for calcination, and heating at 600 to 900° C. under nitrogen atmosphere for nitridation. A part of EuN may be replaced with Eu$_2$O$_3$.

As for the AlN, direct nitridation or nitridation based on reduction of alumina is used. However, AlN with a high purity may be also employed, as it is generally available. For example, AlN (F, E grade) manufactured by Tokuyama Corporation can be used.

Next, explanations are given for the case in which the siliconitride phosphor is a Sr$_2$Si$_5$N$_8$ phosphor. The Sr$_2$Si$_5$N$_8$ phosphor according to the invention indicates a phosphor having A$_2$Si$_5$N$_8$ crystal structure in which Sr is present in the A site of crystals and an activating rare earth metal like Eu is dissolved in solid state in the crystals. Further, it is also possible that Ca and Ba are partially dissolved in solid state in the A site. The method for producing a Sr$_2$Si$_5$N$_8$ phosphor according to the invention includes mixing a powder of the silicon nitride powder having oxygen content of 0.2% by weight to 0.9% by weight, a material like Sr$_3$N$_2$ as a strontium source, and a material like EuN as an europium source to have the general formula of (Eu$_x$Sr$_{1-x}$)$_2$Si$_5$N$_8$ and calcining the mixture at 1400 to 2000° C. under nitrogen atmosphere of 0.05 MPa to 100 MPa.

Examples of the material as a strontium source include a metal strontium as well as strontium nitride (Sr$_3$N$_2$ and Sr$_2$N) Examples of the material as an europium source include a metal europium and europium oxide as well as europium nitride.

In addition to a Sr element, Ca or Ba also can form a A$_2$Si$_5$N$_8$ crystal structure. However, it is preferable to contain Sr and it is desirably Sr.

The Sr$_2$Si$_5$N$_8$ phosphor according to the invention may emit light even when Mn, Ce, Pr, Nd, Sm, or Yb is used as a light source instead of Eu element. However, it is preferable to contain Eu and it is desirably Eu.

The obtained Sr$_2$Si$_5$N$_8$ phosphor is a phosphor represented by the general formula of (Eu$_x$Sr$_{1-x}$)$_2$Si$_5$N$_8$ and part of Sr in Sr$_2$Si$_5$N$_8$ is replaced with Eu. The replacement amount x is, although not specifically limited, within the range of 0.01<x<0.2 in general.

As for the raw material, generally silicon nitride (Si$_3$N$_4$), strontium nitride (Sr$_3$N$_2$), and europium nitride (EuN) are preferably used. As for the method for producing the raw material, any method can be employed if it allows obtainment of the nitride products described above as a final product.

Next, explanations are given for the case in which the siliconitride phosphor is a (Sr, Ca)AlSiN$_3$ phosphor. The (Sr, Ca)AlSiN$_3$ phosphor according to the invention indicates a phosphor in which part of the Ca sites in a CaAlSiN$_3$ phosphor is replaced with Sr and part of the site is also replaced with a rare earth activating element M such as Eu. The method for producing a (Sr, Ca)AlSiN$_3$ phosphor according to the invention includes mixing a powder of the silicon nitride having average particle diameter of 1.0 μm to 12 μm and oxygen content of 0.2% by weight to 0.9% by weight, a material such as Sr$_3$N$_2$ as a strontium source, a material such as Ca$_3$N$_2$ as a calcium source, a material such as EuN as an europium source, and a material such as AlN as an aluminum source to have the general formula of (Eu$_x$Sr$_y$Ca$_z$)AlSiN$_3$ and calcining the mixture at 1400 to 2000° C. under a nitrogen atmosphere of 0.0 MPa to 100 MPa.

Examples of the material as a strontium source include a metal strontium as well as strontium nitride (Sr$_3$N$_2$). Examples of the material as a calcium source include a metal calcium as well as calcium nitride (Ca$_3$N$_2$). Examples of the material as an europium source include a metal europium as well as europium nitride (EuN). Examples of the material as an aluminum source include a metal aluminum as well as aluminum nitride (AlN).

The (Sr, Ca)AlSiN$_3$ phosphor according to the invention may emit light even when Ce, Pr, Nd, Sm, or Yb is used as a light source instead of Eu element. However, it is preferable to contain Eu and it is desirably Eu.

The obtained (Sr, Ca)AlSiN$_3$ phosphor is a phosphor represented by the general formula of (M$_x$Sr$_y$Ca$_z$)AlSiN$_3$ in which x+y+z=1 and 0.1≤y≤0.8. In (Sr, Ca)AlSiN$_3$, part of (Sr, Ca) is replaced with a rare earth element M such as Eu which functions as a light source. The replacement amount x is, although not specifically limited, within the range of 0.002≤x≤0.03 in general.

As for the raw material, generally silicon nitride (Si$_3$N$_4$), strontium nitride (Sr$_3$N$_2$), calcium nitride (Ca$_3$N$_2$), europium nitride (EuN), and aluminum nitride (AlN) are preferably used. As for the method for producing the raw material, any method can be employed if it allows obtainment of the nitride products described above as a final product.

Next, explanations are given for the case in which the siliconitride phosphor is a La$_3$Si$_6$N$_{11}$ phosphor. The La$_3$Si$_6$N$_{11}$ phosphor according to the invention indicates a phosphor in which part of La is replaced with a rare earth activating element such as Ce. The method for producing a La$_3$Si$_6$N$_{11}$ phosphor according to the invention includes mixing a powder of the crystalline silicon nitride having oxygen content of 0.2% by weight to 0.9% by weight, a material such as LaN as a lanthanum source, and a material such as CeN as a cerium source to have the general formula of (Ce$_x$La$_{1-x}$)$_3$Si$_6$N$_{11}$ and calcining the mixture at 1400 to 2000° C. under a nitrogen atmosphere of 0.05 MPa to 100 MPa.

Examples of the material as a lanthanum source include a metal lanthanum as well as lanthanum nitride (LaN). Examples of the material as a cerium source include a metal cerium and cerium oxide as well as cerium nitride.

The La$_3$Si$_6$N$_{11}$ phosphor according to the invention may emit light even when Y, Nd, Sm, or Eu is used as a light source instead of Ce element. However, it is preferable to contain Ce and it is desirably Ce.

The obtained La$_3$Si$_6$N$_{11}$ phosphor is a phosphor represented by the general formula of (Ce$_x$La$_{1-x}$)$_3$Si$_6$N$_{11}$. In La$_3$Si$_6$N$_{11}$, part of La is replaced with Ce. The replacement amount x is, although not specifically limited, within the range of 0.001<x<1.0 in general.

As for the raw material, generally silicon nitride ($Si_3N_4$), lanthanum nitride (LaN), and cerium nitride (CeN) are preferably used. As for the method for producing the raw material, any method can be employed if it allows obtainment of the nitride products described above as a final product.

With regard to the methods for producing the $CaAlSiN_3$ phosphor, $Sr_2Si_5N_8$ phosphor, (Sr, Ca)$AlSiN_3$ phosphor, or $La_3Si_6N_{11}$ phosphor according to the invention, a method for mixing each starting material described above is not particularly limited, and a known method, for example, a method of dry mixing them, or a method of wet mixing them in an inert solvent that does not substantially react with respective components of the raw material and then removing the solvent, may be employed. Examples of the mixing device that is suitably used include a V-type mixer, a rocking mixer, a ball mill, a vibration mill, and a medium stirring mill.

The mixture of the starting materials is calcined at 1400 to 1800° C., preferably from 1500 to 1700° C., under 1 atm in a nitrogen-containing inert gas atmosphere, whereby the desired phosphor is obtained. If the calcining temperature is lower than 1400° C., production of the desired phosphor would require heating for a long time, and thus is not practical. In addition, production ratio of the phosphor in the resulting powder is also lowered. On the other hand, if the calcining temperature exceeds 1800° C., evaporation of calcium, europium, strontium, lanthanum, and cerium becomes significant so that a bright phosphor may not be obtained.

The starting material mixture powder may also be calcined in a temperature range from 1600 to 2000° C., preferably from 1600 to 1900° C., in a pressurized nitrogen gas atmosphere. In this case, evaporation of calcium, europium, and cerium and sublimation and decomposition of $Si_3N_4$ are prevented by pressuring the nitrogen gas, and thus a desired phosphor can be obtained in a short time. The calcining temperature can be elevated by increasing the nitrogen gas pressure, for example, the calcination can be carried out at 1600 to 1850° C. under a nitrogen gas pressure of 5 atm or at 1600 to 2000° C. under a nitrogen gas pressure of 10 atm.

The heating furnace used for the calcining of the powder mixture is not particularly limited and for example, a batch type electric furnace using a high frequency induction heating system or resistance heating system, a rotary kiln, a fluidized firing furnace, or a pusher type electric furnace can be used.

With regard to the methods for producing the $CaAlSin_3$ phosphor, $Sr_2Si_5N_8$ phosphor, (Sr, Ca)$AlSiN_3$ phosphor, or $La_3Si_6N_{11}$ phosphor according to the invention, it is preferable to perform a washing treatment in a solution containing an acid after calcination. It is also preferable that, after calcination, a heating treatment in the temperature range of 300 to 1000° C. is performed under an atmosphere containing one or two or more selected from nitrogen, ammonia, and hydrogen. The $CaAlSiN_3$ phosphor represented by the general formula $(Eu_xCa_{1-x})AlSiN_3$, $Sr_2Si_5N_8$ phosphor represented by the general formula $(Eu_xSr_{1-x})_2Si_5N_8$, (Sr, Ca)$AlSiN_3$ phosphor represented by the general formula $(M_xSr_yCa_z)AlSiN_3$ (in the formula, M represents a light source and a rare earth element such as Eu is used as M. Examples of the rare earth element M as a light source include Ce, Pr, Nd, Sm, and Yb as well as Eu element. However, it is preferable to contain Eu and it is desirably Eu), and $La_3Si_6N_{11}$ phosphor represented by the general formula $(Ce_xLa_{1-x})_3Si_6N_{11}$ (Ce is a light source but light emission can be also obtained with Y, Nd, Sm, or Eu as well as Ce element. However, it is preferable to contain Ce and it is desirably Ce) are the phosphors with higher fluorescent intensity compared to the phosphor obtained by using conventional silicon nitride powder as a raw material.

The $CaAlSiN_3$ phosphor, $Sr_2Si_5N_8$ phosphor, (Sr, Ca)$AlSiN_3$ phosphor, and $La_3Si_6N_{11}$ phosphor according to the invention are a phosphor that is obtained as described above. More specific examples thereof include a $CaAlSiN_3$ phosphor as obtained by calcining a mixture powder containing the silicon nitride powder, $Ca_3N_2$ powder, AlN powder, and EuN powder at 1400 to 2000° C. under nitrogen-containing inert gas, a $Sr_2Si_5N_8$ phosphor as obtained by calcining a mixture powder containing the silicon nitride powder, $Sr_3N_2$ powder, and EuN powder at 1400 to 2000° C. under nitrogen-containing inert gas, a (Sr, Ca)$AlSiN_3$ phosphor in which part of (Sr, Ca) is replaced with Eu as obtained by calcining a mixture powder containing the silicon nitride powder, $Sr_3N_2$ powder, $Ca_3N_2$ powder, EuN powder, and Al powder at 1400 to 2000° C. under nitrogen-containing inert gas, and a $La_3Si_6N_{11}$ phosphor in which part of La is replaced with Ce as obtained by calcining a mixture powder containing the silicon nitride powder, LaN powder, and CeN powder at 1400 to 2000° C. under nitrogen-containing inert gas.

By kneading the $CaAlSiN_3$ phosphor, $Sr_2Si_5N_8$ phosphor, (Sr, Ca)$AlSiN_3$ phosphor, or $La_3Si_6N_{11}$ phosphor according to the invention with a transparent resin such as an epoxy resin and an acryl resin with a known method, a coating agent can be prepared. Further, by coating the agent on a light-emitting diode which emits excitation light, a light conversion type light-emitting diode can be produced and used as a lighting device. It is also possible that, by forming a thin plate which contains the $CaAlSiN_3$ phosphor, $Sr_2Si_5N_8$ phosphor, (Sr, Ca)$AlSi_6N_3$ phosphor, or $La_3Si_6N_{11}$ phosphor according to the invention and arranging it such that it can absorb light of a light-emitting diode as an excitation source, a light conversion type light-emitting diode can be produced and used as a lighting device. Wavelength of the light-emitting diode for use as a excitation source desirably emits light with wavelength of 300 nm to 500 nm for exhibition of the characteristics of the siliconitride phosphor. Preferably, ultraviolet to blue light with wavelength of 300 nm to 470 nm is desirable. Although the $CaAlSiN_3$ phosphor, $Sr_2Si_5N_8$ phosphor, and (Sr, Ca)$AlSiN_3$ phosphor according to the invention emit red fluorescent light, it is also possible to use it in combination of a phosphor exhibiting other color, for example, a phosphor exhibiting yellow color, a phosphor exhibiting orange color, a phosphor exhibiting green color, or a phosphor exhibiting blue color. When it is combined with those phosphors, the red color component emitted by the phosphor according to the invention is increased, and therefore color control can be achieved. Further, although the $La_3Si_6N_{11}$ phosphor according to the invention emits yellow fluorescent light, it is also possible to use it in combination of a phosphor exhibiting other color, for example, a phosphor exhibiting green color, a phosphor exhibiting orange color, a phosphor exhibiting red color, or a phosphor exhibiting blue color. When it is combined with those phosphors, the yellow color component emitted by the phosphor according to the invention is increased, and therefore color control can be achieved.

It is also possible to produce an image display device by using the $CaAlSiN_3$ phosphor, $Sr_2Si_5N_8$ phosphor, (Sr, Ca)$AlSiN_3$ phosphor, or $La_3Si_6N_{11}$ phosphor according to the invention and an excitation source. In this case, as an excitation source, not only a light-emitting diode but also a light source emitting electronic beam, electric filed, vacuum ultraviolet ray, or ultraviolet ray can be employed. The siliconitride phosphor produced by using the silicon nitride powder for siliconitride phosphor according to the invention exhibits no luminance decrease against those excitation sources. Thus, the material can be applied for a vacuum fluorescent display (VFD), a field emission display (FED), a plasma display panel (PDP), a cathode ray tube (CRT), or the like.

EXAMPLES

Herein below, the invention is explained in greater detail in view of specific examples.

First, in the Examples, specific surface area of a powder was measured by using an apparatus for measuring specific surface area, i.e., FLOW SORB 2300 manufactured by Shimadzu Corporation, according to BET method based on nitrogen gas adsorption. Oxygen content was measured by an oxygen and nitrogen analyzer manufactured by LECO Corporation. Meanwhile, the average particle diameter was measured from a scanning electron microscope image as follows. Specifically, a circle is drawn on a scanning electron microscope image, and for each particle of about 150 particles in contact with the circle, a maximum-size circle inscribed to the particle is determined, and by taking the diameter of the circle as a particle diameter, the average value of the diameter was calculated for the particles and the average particle diameter of particles was obtained accordingly.

Production of a Powder of Crystalline Silicon Nitride

Example 1

First, a powder of crystalline silicon nitride needed in the invention was produced. The production method is as follows.

By reacting a toluene solution containing silicon tetrachloride at 50% by volume concentration with liquid ammonia, silicon diimide having powder volume density (that is, apparent density) of 0.13 g/cm$^3$ was produced and subjected to thermal degradation at 1150° C. under a nitrogen gas atmosphere to give amorphous silicon nitride powder having powder volume density (that is, apparent density) of 0.25 g/cm$^3$. In the resulting material, metal impurities present in amorphous silicon nitride powder were lowered to 10 ppm or less according to a known method for improving materials of a reaction vessel and friction state between powder and a metal in an apparatus for handling the powder. Further, nitrogen gas with the oxygen concentration of 0.4% by volume was purged into the heating furnace.

The amorphous silicon nitride powder was filled in a carbon crucible, and the crucible was gradually heated by a temperature rise schedule of from room temperature to 1100° C. for 1 hour and from 1100° C. to 1400° C. at 50° C./hr, and from 1400° C. to 1500° C. for one hour and maintaining at 1500° C. for one hour, and thus a powder of crystalline silicon nitride according to Example 1 was produced.

Particles of the obtained powder of crystalline silicon nitride are illustrated in FIG. 1. The specific surface area was 10 m$^2$/g, the average particle diameter was 0.2 μm, and the oxygen content was 0.89% by weight.

As a result of analyzing the impurities using fluorescent X ray, it was found that Al is 0 ppm, Ca is 16 ppm, and Fe is 16 ppm, indicating extremely small amount of impurities.

Example 2

The nitrogen gas purged into the heating furnace for obtaining amorphous silicon nitride powder by heating silicon diimide was introduced while the oxygen concentration in the nitrogen gas is controlled to 0.2% by volume. Other than that, the powder of crystalline silicon nitride according to Example 2 was produced in the same manner as Example 1. The specific surface area of the obtained powder of crystalline silicon nitride was 10 m$^2$/g, the average particle diameter was 0.2 μm, and the oxygen content was 0.72% by weight.

Example 3

The nitrogen gas purged into the heating furnace for obtaining amorphous silicon nitride powder by heating silicon diimide was introduced while the oxygen concentration in the nitrogen gas is controlled to 0.001% by volume or less. Other than that, the powder of crystalline silicon nitride according to Example 3 was produced in the same manner as Example 1. The specific surface area of the obtained powder of crystalline silicon nitride was 10 m$^2$/g, the average particle diameter was 0.2 μm, and the oxygen content was 0.60% by weight.

Example 4

The nitrogen gas purged into the heating furnace for obtaining amorphous silicon nitride powder by heating silicon diimide was introduced while the oxygen concentration in the nitrogen gas is controlled to 0.5% by volume. In addition, the temperature for calcining the amorphous silicon nitride powder was slowly increased from 1100° C. to 1400° C. in 20° C./h. Other than that, the powder of crystalline silicon nitride according to Example 4 was produced in the same manner as Example 1. The obtained powder of crystalline silicon nitride was a type silicon nitride powder. The particles are illustrated in FIG. 2. The specific surface area was 1.0 m$^2$/g, the average particle diameter was 3.0 μm, and the oxygen content was 0.72% by weight.

Example 5

The nitrogen gas purged into the heating furnace for obtaining amorphous silicon nitride powder by heating silicon diimide was introduced while the oxygen content in the nitrogen gas is controlled to 0.0006% by volume or less. Other than that, the powder of crystalline silicon nitride according to Example 5 was produced in the same manner as Example 4. The specific surface area of the obtained powder of crystalline silicon nitride was 1.0 m$^2$/g, the average particle diameter was 3.0 μm, and the oxygen content was 0.34% by weight.

Example 6

The nitrogen gas purged into the heating furnace for obtaining amorphous silicon nitride powder by heating silicon diimide was introduced while the oxygen concentration in the nitrogen gas is controlled to 0.6% by volume. In addition, the temperature for calcining the amorphous silicon nitride powder was slowly increased from 1100° C. to 1400° C. in 10° C./h. Other than that, the powder of crystalline silicon nitride according to Example 6 was produced in the same manner as Example 1. The specific surface area of the obtained powder of crystalline silicon nitride was 0.3 m$^2$/g, the average particle diameter was 8.0 μm, and the oxygen content was 0.75% by weight.

Example 7

The nitrogen gas purged into the heating furnace for obtaining amorphous silicon nitride powder by heating silicon diimide was introduced while the oxygen content in the nitrogen gas is controlled to 0.0005% by volume or less. Other than that, the powder of crystalline silicon nitride according to Example 7 was produced in the same manner as Example 6. The specific surface area of the obtained powder of crystalline silicon nitride was 0.3 m$^2$/g, the average particle diameter was 8.0 μm, and the oxygen content was 0.29% by weight.

Example 8

The nitrogen gas purged into the heating furnace for obtaining amorphous silicon nitride powder by heating silicon diimide was introduced while the oxygen concentration in the nitrogen gas is controlled to 0.5% by volume. In addition, the temperature for calcining the amorphous silicon nitride powder was slowly increased from 1100° C. to 1400° C. in 40° C./h. Other than that, the powder of crystalline silicon nitride according to Example 8 was produced in the same manner as Example 1. The specific surface area of the obtained powder of crystalline silicon nitride was 3.0 m$^2$/g, the average particle diameter was 1.0 μm, and the oxygen content was 0.73% by weight.

Example 9

The crystalline silicon nitride powder used in Example 8 (specific surface area was 3.0 m$^2$/g, the average particle diameter was 1.0 μm, and the oxygen content was 0.73% by weight) was added to an acid solution in which fluoride acid: crystalline silicon nitride=0.5 g:1.0 g and subjected to mixing by a ball mill. After washing with water, the powder of crystalline silicon nitride according to Example 9 was produced. The oxygen content in the obtained powder of crystalline silicon nitride was lowered to 0.53% by weight.

Example 10

The nitrogen gas purged into the heating furnace for obtaining amorphous silicon nitride powder by heating silicon diimide was introduced while the oxygen concentration in the nitrogen gas is controlled to 0.0006% by volume or less. Other than that, the powder of crystalline silicon nitride according to Example 10 was produced in the same manner as Example 8. The specific surface area of the obtained powder of crystalline silicon nitride was 3.0 m$^2$/g, the average particle diameter was 1.0 μm, and the oxygen content was 0.33% by weight.

Comparative Example 1

The nitrogen gas purged into the heating furnace for obtaining amorphous silicon nitride powder by heating silicon diimide was introduced while the oxygen concentration in the nitrogen gas is controlled to 1.3% by volume. In addition, the temperature for calcining the amorphous silicon nitride powder was slowly increased from 1100° C. to 1400° C. in 50° C./h. Other than that, the powder of crystalline silicon nitride according to Comparative Example 1 was produced in the same manner as Example 1. The specific surface area of the obtained powder of crystalline silicon nitride was 10 m$^2$/g, the average particle diameter was 0.2 μm, and the oxygen content was 1.34% by weight.

Comparative Example 2

The nitrogen gas purged into the heating furnace for obtaining amorphous silicon nitride powder by heating silicon diimide was introduced while the oxygen concentration in the nitrogen gas is controlled to 2.0% by volume. In addition, the temperature for calcining the amorphous silicon nitride powder was slowly increased from 1100° C. to 1400° C. in 40° C./h. Other than that, the powder of crystalline silicon nitride according to Comparative Example 2 was produced in the same manner as Example 1. The specific surface area of the obtained powder of crystalline silicon nitride was 3.0 m$^2$/g, the average particle diameter was 1.0 μm, and the oxygen content was 1.65% by weight.

Comparative Example 3

The nitrogen gas purged into the heating furnace for obtaining amorphous silicon nitride powder by heating silicon diimide was introduced while the oxygen concentration in the nitrogen gas is controlled to 1.8% by volume. In addition, the temperature for calcining the amorphous silicon nitride powder was slowly increased from 1100° C. to 1400° C. in 20° C./h. Other than that, the powder of crystalline silicon nitride according to Comparative Example 3 was produced in the same manner as Example 1. The specific surface area of the obtained powder of crystalline silicon nitride was 1.0 m$^2$/g, the average particle diameter was 3.0 μm, and the oxygen content was 1.55% by weight.

Comparative Example 4

The nitrogen gas purged into the heating furnace for obtaining amorphous silicon nitride powder by heating silicon diimide was introduced while the oxygen concentration in the nitrogen gas is controlled to 1.6% by volume. In addition, the temperature for calcining the amorphous silicon nitride powder was slowly increased from 1100° C. to 1400° C. in 10° C./hr. Other than that, the powder of crystalline silicon nitride relating to Comparative Example 4 was produced in the same manner as Example 1. The specific surface area of the obtained powder of crystalline silicon nitride was 0.3 m$^2$/g, the average particle diameter was 8.0 μm, and the oxygen content was 1.42% by weight.

Comparative Example 5

The nitrogen gas purged into the heating furnace for obtaining amorphous silicon nitride powder by heating silicon diimide was introduced while the oxygen concentration in the nitrogen gas is controlled to 0.4% by volume. In addition, the temperature for calcining the amorphous silicon nitride powder was slowly increased from 1100° C. to 1400° C. in 50° C./h. Other than that, the powder of crystalline silicon nitride relating to Comparative Example 5 was produced in the same manner as Example 1. The specific surface area of the obtained powder of crystalline silicon nitride was 10 m$^2$/g, the average particle diameter was 0.2 μm, and the oxygen content was 0.93% by weight.

Production of CaAlSiN$_3$ phosphor

Examples 11 to 20 and Comparative Examples 6 to 9

By using the powder of crystalline silicon nitride according to Examples 1 to 10 and Comparative Examples 1 to 4, siliconitride phosphors according to Examples 11 to 20 and Comparative Examples 6 to 9 were prepared. Specifically, a silicon nitride powder, an aluminum nitride powder, a calcium nitride powder, and an europium nitride powder were weighed in a nitrogen box to have composition of $Eu_{0.008}Ca_{0.992}AlSiN_3$. These raw materials were mixed for one hour using a shaking mill under a nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1800° C. for two hours, that is, total four hours to 1800° C. After maintaining for hours at 1800° C., the furnace was cooled and the crucible was removed. The synthesized sample was briefly pulverized and subjected to powder X ray diffraction measurement (XRD). As a result, it was found to be a $CaAlSiN_3$ phosphor in which a part of Ca is replaced with Eu.

The powder was pulverized by using an agate mortar and pestle, a dry type pulverizer, and a wet type pulverizer. After pulverization to a pre-determined particle diameter, the fluorescence characteristics were evaluated at excitation of 450 nm by using FP-6500 equipped with an integrating sphere, manufactured by JASCO Corporation.

In Table 1, a specific surface area and an oxygen content of the powder of crystalline silicon nitride as a raw material, and also the relative fluorescence intensity of the obtained $CaAlSiN_3$ phosphor when the fluorescence intensity of Comparative Example 6 is 100 are summarized.

TABLE 1

| | Silicon nitride raw material | | | characteristics of phosphor |
|---|---|---|---|---|
| | Specific surface area ($m^2/g$) | Average particle diameter (μm) | Oxygen content (% by weight) | Fluorescent intensity (relative intensity) |
| Example 11 | Example 1 | 10 | 0.2 | 0.89 | 105 |
| Example 12 | Example 2 | 10 | 0.2 | 0.72 | 109 |
| Example 13 | Example 3 | 10 | 0.2 | 0.60 | 113 |
| Example 14 | Example 4 | 1.0 | 3.0 | 0.72 | 122 |
| Example 15 | Example 5 | 1.0 | 3.0 | 0.34 | 125 |
| Example 16 | Example 6 | 0.3 | 8.0 | 0.75 | 128 |
| Example 17 | Example 7 | 0.3 | 8.0 | 0.29 | 130 |
| Example 18 | Example 8 | 3.0 | 1.0 | 0.73 | 115 |
| Example 19 | Example 9 | 3.0 | 1.0 | 0.53 | 122 |
| Example 20 | Example 10 | 3.0 | 1.0 | 0.33 | 125 |
| Comparative Example 6 | Comparative Example 1 | 10 | 0.2 | 1.34 | 100 |
| Comparative Example 7 | Comparative Example 2 | 3.0 | 1.0 | 1.65 | 90 |
| Comparative Example 8 | Comparative Example 3 | 1.0 | 3.0 | 1.55 | 85 |
| Comparative Example 9 | Comparative Example 4 | 0.3 | 8.0 | 1.42 | 95 |

Production of $Sr_2Si_5N_8$ Phosphor

Examples 21 to 29 and Comparative Examples 10 to 13

By using the powder of crystalline silicon nitride according to Examples 1 and 3 to 10 and Comparative Examples 1 to 4, siliconitride phosphors according to Examples 21 to 29 and Comparative Examples 10 to 13 were prepared. Specifically, a silicon nitride powder, a strontium nitride powder, and an europium nitride powder were weighed in a nitrogen box to have composition of $Eu_{0.06}Sr_{1.94}Si_5N_8$. These raw materials were mixed for one hour using a shaking mill under a nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1600° C. for two hours, that is, total four hours to 1600° C. After maintaining for 6 hours at 1600° C., the furnace was cooled and the crucible was removed. The synthesized sample was briefly pulverized and subjected to powder X ray diffraction measurement (XRD). As a result, it was found to be a $Sr_2Si_5N_8$ phosphor in which a part of Sr is replaced with Eu.

The powder was pulverized by using an agate mortar and pestle, a dry type pulverizer, and a wet type pulverizer. After pulverization to a pre-determined particle diameter, the fluorescence characteristics were evaluated at excitation of 450 nm by using FP-6500 equipped with an integrating sphere, manufactured by JASCO Corporation.

In Table 2, a specific surface area and an oxygen content of the powder of crystalline silicon nitride as a raw material, and also the relative fluorescence intensity of the obtained $Sr_2Si_5N_8$ phosphor when the fluorescence intensity of Comparative Example 10 is 100 are summarized.

TABLE 2

| | Silicon nitride raw material | | | Characteristics of phosphor |
|---|---|---|---|---|
| | Specific surface area ($m^2/g$) | Average particle diameter (μm) | Oxygen content (% by weight) | Fluorescent intensity (relative intensity) |
| Example 21 | Example 1 | 10 | 0.2 | 0.89 | 105 |
| Example 22 | Example 3 | 10 | 0.2 | 0.60 | 109 |
| Example 23 | Example 4 | 1.0 | 3.0 | 0.72 | 117 |
| Example 24 | Example 5 | 1.0 | 3.0 | 0.34 | 125 |
| Example 25 | Example 6 | 0.3 | 8.0 | 0.75 | 120 |
| Example 26 | Example 7 | 0.3 | 8.0 | 0.29 | 127 |
| Example 27 | Example 8 | 3.0 | 1.0 | 0.73 | 111 |
| Example 28 | Example 9 | 3.0 | 1.0 | 0.53 | 118 |
| Example 29 | Example 10 | 3.0 | 1.0 | 0.33 | 120 |
| Comparative Example 10 | Comparative Example 1 | 10 | 0.2 | 1.34 | 100 |
| Comparative Example 11 | Comparative Example 2 | 3.0 | 1.0 | 1.65 | 92 |
| Comparative Example 12 | Comparative Example 3 | 1.0 | 3.0 | 1.55 | 94 |
| Comparative Example 13 | Comparative Example 4 | 0.3 | 8.0 | 1.42 | 96 |

Production of $(Sr, Ca)AlSiN_3$ Phosphor

Examples 30 to 36 and Comparative Examples 14 to 18

By using the powder of crystalline silicon nitride according to Examples 4 to 10 and Comparative Examples 1 to 5, siliconitride phosphors according to Examples 30 to 36 and Comparative Examples 14 to 18 were prepared. Specifically, a silicon nitride powder, a strontium nitride powder, a calcium nitride powder, an europium nitride powder, and an aluminum nitride powder were weighed in a nitrogen box to have composition of $Eu_{0.008}Sr_{0.7936}Ca_{0.1984}AlSiN_3$. The materials were mixed for one hour using a shaking mill under a nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1800° C. for two hours, that is, total four hours to 1800° C. After maintaining for 6 hours at 1800° C., the furnace was cooled and the crucible was removed. The synthesized sample was briefly pulverized and subjected to powder X ray diffraction measurement (XRD). As a result, it was found to be a (Sr, Ca)AlSiN$_3$ phosphor in which a part of (Sr, Ca) is replaced with Eu.

The powder was pulverized by using an agate mortar and pestle, a dry type pulverizer, and a wet type pulverizer. After pulverization to a pre-determined particle diameter, the fluorescence characteristics were evaluated at excitation of 450 nm by using FP-6500 equipped with an integrating sphere, manufactured by JASCO Corporation.

In Table 3, a specific surface area and an oxygen content of the powder of crystalline silicon nitride as a raw material, and also the relative fluorescence intensity of the obtained (Sr, Ca)AlSiN$_3$ phosphor when the fluorescence intensity of Comparative Example 18 is 100 are summarized.

TABLE 3

| | Silicon nitride raw material | | | Characteristics of phosphor |
|---|---|---|---|---|
| | | Specific surface area (m$^2$/g) | Average particle diameter (µm) | Oxygen content (% by weight) | Fluorescent intensity (relative intensity) |
| Example 30 | Example 4 | 1.0 | 3.0 | 0.72 | 118 |
| Example 31 | Example 5 | 1.0 | 3.0 | 0.34 | 124 |
| Example 32 | Example 6 | 0.3 | 8.0 | 0.75 | 116 |
| Example 33 | Example 7 | 0.3 | 8.0 | 0.29 | 128 |
| Example 34 | Example 8 | 3.0 | 1.0 | 0.73 | 108 |
| Example 35 | Example 9 | 3.0 | 1.0 | 0.53 | 115 |
| Example 36 | Example 10 | 3.0 | 1.0 | 0.33 | 120 |
| Comparative Example 14 | Comparative Example 1 | 10 | 0.2 | 1.34 | 88 |
| Comparative Example 15 | Comparative Example 2 | 3.0 | 1.0 | 1.65 | 90 |
| Comparative Example 16 | Comparative Example 3 | 1.0 | 3.0 | 1.55 | 94 |
| Comparative Example 17 | Comparative Example 4 | 0.3 | 8.0 | 1.42 | 98 |
| Comparative Example 18 | Comparative Example 5 | 10 | 0.2 | 0.93 | 100 |

Example 37

By using the powder of crystalline silicon nitride according to Example 4 (the specific surface area was 1.0 m$^2$/g, the average particle diameter was 3.0 µm, and the oxygen content was 0.72% by weight), a silicon nitride powder, a strontium nitride powder, a calcium nitride powder, an europium nitride powder, and an aluminum nitride powder were weighed in a nitrogen box to have composition of $Eu_{0.002}Sr_{0.7936}Ca_{0.2044}AlSiN_3$. Other than that, a (Sr, Ca)AlSiN$_3$ phosphor in which a part of (Sr, Ca) is replaced with Eu was produced in the same manner as Examples 30 to 36. The results are listed in Table 4.

Example 38

A silicon nitride powder, a strontium nitride powder, a calcium nitride powder, an europium nitride powder, and an aluminum nitride powder were weighed to have composition of $Eu_{0.03}Sr_{0.7936}Ca_{0.1764}AlSiN_3$. Other than that, a (Sr, Ca)AlSiN$_3$ phosphor in which a part of (Sr, Ca) is replaced with Eu was produced in the same manner as Examples 30 to 36. The results are listed in Table 4.

Example 39

A silicon nitride powder, a strontium nitride powder, a calcium nitride powder, an europium nitride powder, and an aluminum nitride powder were weighed to have composition of $Eu_{0.008}Sr_{0.1}Ca_{0.892}AlSiN_3$. Other than that, a (Sr, Ca)AlSiN$_3$ phosphor in which a part of (Sr, Ca) is replaced with Eu was produced in the same manner as Examples 30 to 36. The results are listed in Table 4.

Example 40

A silicon nitride powder, a strontium nitride powder, a calcium nitride powder, an europium nitride powder, and an aluminum nitride powder were weighed to have composition of $Eu_{0.008}Sr_{0.5}Ca_{0.492}AlSiN_3$. Other than that, a (Sr, Ca)AlSiN$_3$ phosphor in which a part of (Sr, Ca) is replaced with Eu was produced in the same manner as Examples 30 to 36. The results are listed in Table 4.

TABLE 4

| | Composition formula (mol) | | | Characteristics of phosphor Fluorescent intensity |
|---|---|---|---|---|
| | Eu | Sr | Ca | (relative intensity) |
| Example 30 | 0.008 | 0.794 | 0.1984 | 118 |
| Example 37 | 0.002 | 0.794 | 0.2044 | 120 |
| Example 38 | 0.030 | 0.794 | 0.1764 | 119 |
| Example 39 | 0.008 | 0.1 | 0.892 | 121 |
| Example 40 | 0.008 | 0.5 | 0.492 | 118 |

Production of La$_3$Si$_6$N$_{11}$ Phosphor

Examples 41 to 47 and Comparative Examples 19 to 23

By using the powder of crystalline silicon nitride according to Examples 4 to 10 and Comparative Examples 1 to 5, siliconitride phosphors according to Examples 41 to 47 and Comparative Examples 19 to 23 were prepared. Specifically, a silicon nitride powder, a lanthanum nitride powder, and a cerium nitride powder were weighed in a nitrogen box to have composition of $Ce_{0.1}La_{2.9}Si_6N_{11}$. These raw materials were mixed for one hour using a shaking mill under a nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1950° C. for three hours, that is, total five hours to 1950° C. After maintaining for 2 hours at 1950° C., the furnace was cooled and the crucible was removed. The synthesized sample was briefly pulverized and subjected to powder X ray diffraction measurement (XRD). As a result, it was found to be a La$_3$Si$_6$N$_{11}$ phosphor in which a part of La is replaced with Ce.

The powder was pulverized by using an agate mortar and pestle, a dry type pulverizer, and a wet type pulverizer. After pulverization to a pre-determined particle diameter, the fluorescence characteristics were evaluated at excitation of 450 nm by using FP-6500 equipped with an integrating sphere, manufactured by JASCO Corporation.

In Table 5, a specific surface area and an oxygen content of the powder of crystalline silicon nitride as a raw material, and also the relative fluorescence intensity of the obtained La$_3$Si$_6$N$_{11}$ phosphor when the fluorescence intensity of Comparative Example 23 is 100 are summarized.

TABLE 5

| | | Silicon nitride raw material | | | Characteristics of phosphor |
|---|---|---|---|---|---|
| | | Specific surface area (m$^2$/g) | Average particle diameter (μm) | Oxygen content (% by weight) | Fluorescent intensity (relative intensity) |
| Example 41 | Example 4 | 1.0 | 3.0 | 0.72 | 118 |
| Example 42 | Example 5 | 1.0 | 3.0 | 0.34 | 135 |
| Example 43 | Example 6 | 0.3 | 8.0 | 0.75 | 128 |
| Example 44 | Example 7 | 0.3 | 8.0 | 0.29 | 138 |
| Example 45 | Example 8 | 3.0 | 1.0 | 0.73 | 108 |
| Example 46 | Example 9 | 3.0 | 1.0 | 0.53 | 120 |
| Example 47 | Example 10 | 3.0 | 1.0 | 0.33 | 129 |
| Comparative Example 19 | Comparative Example 1 | 10 | 0.2 | 1.34 | 85 |
| Comparative Example 20 | Comparative Example 2 | 3.0 | 1.0 | 1.65 | 87 |
| Comparative Example 21 | Comparative Example 3 | 1.0 | 3.0 | 1.55 | 88 |
| Comparative Example 22 | Comparative Example 4 | 0.3 | 8.0 | 1.42 | 90 |
| Comparative Example 23 | Comparative Example 5 | 10 | 0.2 | 0.93 | 100 |

The invention claimed is:

1. A crystalline silicon nitride powder for siliconitride phosphors, which consists of an α-type crystalline silicon nitride powder and is used as a raw material for producing a siliconitride phosphor comprising a silicon element and a nitrogen element but no oxygen element as a constituent element, an oxygen content of said silicon nitride powder being 0.2% by weight to 0.8% by weight, wherein the silicon nitride powder has an average particle diameter of 3 μm to 12 μm, a specific surface area of 0.2 to 1.0 m$^2$/g.

2. A method for producing a CaAlSiN$_3$ phosphor by using as a raw material a crystalline silicon nitride powder for the siliconitride phosphors comprising a silicon element and a nitrogen element but no oxygen element as a constituent element, an oxygen content of said silicon nitride powder being 0.2 by weight to 0.8% by weight, wherein the silicon nitride powder has an average particle diameter of 1.0 to 12 μm, and a specific surface area of 0.2 or more and less than 3.0 m$^2$/g, the method comprising:
   mixing the silicon nitride powder for the siliconitride phosphors, a material as an aluminum source, a material as a calcium source, and a material as an europium source to have the general formula of (Eu$_x$Ca$_{1-x}$)AlSiN$_3$ (with the proviso that, 0<x<0.1); and
   calcining the mixture at 1400 to 2000° C. under a nitrogen atmosphere of 0.05 MPa to 100 MPa.

3. A method for producing a Sr$_2$Si$_5$N$_5$ phosphor by using as a raw material a crystalline silicon nitride powder for the siliconitride phosphors comprising a silicon element and a nitrogen element but no oxygen element as a constituent element, an oxygen content of said silicon nitride powder being 0.2 by weight to 0.8% by weight, wherein the silicon nitride powder has an average particle diameter of 1.0 to 12 μm, and a specific surface area of 0.2 or more and less than 3.0 m$^2$/g, the method comprising:
   mixing the silicon nitride powder for the siliconitride phosphors, a material as a strontium source, and a material as an europium source to have the general formula of (Eu$_x$Sr$_{1-x}$)$_2$Si$_5$N$_8$ (with the proviso that, 0.01<x<0.2); and
   calcining the mixture at 1400 to 2000° C. under a nitrogen atmosphere of 0.05 MPa to 100 MPa.

4. A method for producing a (Sr, Ca)AlSiN$_3$ phosphor by using as a raw material a crystalline silicon nitride powder for the siliconitride phosphors comprising a silicon element and a nitrogen element but no oxygen element as a constituent element, an oxygen content of said silicon nitride powder being 0.2 by weight to 0.8% by weight, wherein the silicon nitride powder has an average particle diameter of 1.0 to 12 μm, and a specific surface area of 0.2 or more and less than 3.0 m$^2$/g, the method comprising:
   mixing the silicon nitride powder for the siliconitride phosphors, a material as a strontium source, a material as a calcium source, a material as an europium source, and a material as an aluminum source to have the general formula of (Eu$_x$Sr$_y$Ca$_z$)AlSiN$_3$ (with the proviso that, x+y+z=1, 0.002≤x≤0.03, and 0.1≤y≤0.8); and
   calcining the mixture at 1400 to 2000° C. under a nitrogen atmosphere of 0.05 MPa to 100 MPa.

5. A method for producing a La$_3$Si$_6$N$_{11}$ phosphor by using as a raw material a crystalline silicon nitride powder for the siliconitride phosphors comprising a silicon element and a nitrogen element but no oxygen element as a constituent element, an oxygen content of said silicon nitride powder being 0.2 by weight to 0.8% by weight, wherein the silicon nitride powder has an average particle diameter of 1.0 to 12 μm, and a specific surface area of 0.2 or more and less than 3.0 m$^2$/g, the method comprising:
   mixing the silicon nitride powder for the siliconitride phosphors, a material as a lanthanum source, and a material as a cerium source to have the general formula of (Ce$_x$La$_{1-x}$)$_3$Si$_6$N$_{11}$ (with the proviso that, 0.001<x<1.0); and
   calcining the mixture at 1400 to 2000° C. under a nitrogen atmosphere of 0.05 MPa to 100 MPa.

6. The crystalline silicon nitride powder for siliconitride phosphors according to claim 1, which is produced by a method comprising calcining an amorphous silicon nitride powder.

* * * * *